United States Patent
Qian et al.

(10) Patent No.: US 10,509,554 B2
(45) Date of Patent: Dec. 17, 2019

(54) METHOD FOR OUTPUTTING TARGET CONTENT AND TERMINAL THEREFOR

(71) Applicant: JRD Communication Inc., Shenzhen (CN)

(72) Inventors: Wen Qian, Shenzhen (CN); Yu Zheng, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 466 days.

(21) Appl. No.: 14/899,867

(22) PCT Filed: Apr. 8, 2015

(86) PCT No.: PCT/CN2015/076073
§ 371 (c)(1),
(2) Date: Dec. 18, 2015

(87) PCT Pub. No.: WO2016/095368
PCT Pub. Date: Jun. 23, 2016

(65) Prior Publication Data
US 2016/0370983 A1    Dec. 22, 2016

(30) Foreign Application Priority Data
Dec. 17, 2014  (CN) .......................... 2014 1 0798762

(51) Int. Cl.
*G06F 3/0481*    (2013.01)
*G06F 3/0484*    (2013.01)
(Continued)

(52) U.S. Cl.
CPC ........ *G06F 3/04847* (2013.01); *G06F 3/0486* (2013.01); *G06F 3/0488* (2013.01)

(58) Field of Classification Search
CPC ... G06F 3/0482; G06F 3/04817; H04L 41/22; H04L 43/045; G06Q 20/32
See application file for complete search history.

(56) References Cited

U.S. PATENT DOCUMENTS 9,634,903 B2 *   4/2017   Yan .......................... H04L 41/22
2009/0249196 A1  10/2009  Yamaji et al.
(Continued)

FOREIGN PATENT DOCUMENTS

CN    102638610 A    8/2012
CN    104572008 A    4/2015

OTHER PUBLICATIONS

International Search Report from PCT Application No. PCT/CN2015/076073 dated Oct. 9, 2015.

*Primary Examiner* — Namitha Pillai

(57) ABSTRACT

A method for outputting a target content and a terminal may include acquiring the target content and displaying a target content logo; determining corresponding output modes based on the target content, and displaying a preset area corresponding to each of the output modes. When it is detected that the target content logo is dragged to at least one of the preset areas, the method may include outputting the target content in the output mode corresponding to the preset area. Output modes may be displayed that support the target content selected by a user. The method can enable the user to rapidly select or switch the output mode, and facilitate user operations.

7 Claims, 3 Drawing Sheets

(51) Int. Cl.
*G06F 3/0486* (2013.01)
*G06F 3/0488* (2013.01)

(56) References Cited

U.S. PATENT DOCUMENTS

2015/0095776 A1* 4/2015 Egan .................... H04L 43/045
 715/716
2016/0073151 A1* 3/2016 Keller .............. H04N 21/42208
 348/734

* cited by examiner

METHOD FOR OUTPUTTING TARGET CONTENT AND TERMINAL THEREFOR

TECHNICAL FIELD

The present invention relates to mobile communications terminals, and in particular relates to a method for outputting a target content and a terminal.

BACKGROUND

Currently, mobile terminals may support more and more formats and contents, and a user may listen to music, watch videos and compile documents through a mobile terminal. A mobile terminal may function as a memory device for storage, or as a transmitting device for transmitting data to accessories connected to the mobile terminal.

An application may have a variety of outputting modes or operating modes, but the variety of outputting modes or operating modes may spread in different selection menus. When a user needs to switch outputting modes or operating modes for the same application, it may be very difficult to find the operating menu in one step.

For example, when a user is playing music by opening a player, if the mobile terminal is inserted with an earphone, then by default, the music may be played through the earphone. If the user wants to play the music through a speaker or to transmit the music file via USB to other devices, it may be impossible for the user to complete the switch in one step. The switch can be completed by unplugging the earphone, or exiting the music playing interface, entering a folder to look for the music file, and other operations, which may be very troublesome.

SUMMARY

The present invention includes a method for outputting a target content and a terminal, which can display hardware devices that support target content selected by a user and available output modes for the target content, thereby enabling the user to rapidly select or switch the output mode so as to output the target content.

In an embodiment, a method for outputting a target content comprises: acquiring the target content and displaying the target content logo; determining corresponding output modes based on the target content, and displaying preset areas corresponding to the output modes around the target content logo; alternatively, determining output modes corresponding to the target content based on the target content and output modes supported by the terminal, and according to the determined output modes for the target content, displaying a preset area at a position on the display area of the terminal and close to the hardware port or software mark corresponding to each of the output modes, wherein each of the output modes supported by the terminal can be correspondingly provided with a hardware port or a software mark; and when it is detected that the target content logo is dragged to at least one of the preset areas, the method includes outputting the target content in the output mode corresponding to the preset area.

In an embodiment, displaying a preset area at a position on the display area of the terminal and close to the hardware port or software mark corresponding to each of the output modes may include based on the determined output modes of the target content, determining the position of the hardware port or software mark corresponding to each of the output modes on the terminal; wherein, positions of the hardware ports or software marks corresponding to the output modes supported by the terminal are preset; and based on the determined position, displaying a preset area close to each of the positions on the display area of the terminal.

In an embodiment, corresponding logos or texts are displayed in the preset areas corresponding to the output modes.

In an embodiment, a method for outputting a target content comprises: acquiring the target content and displaying the target content logo; determining corresponding output modes based on the target content, and displaying a preset area corresponding to each of the output modes; and upon detecting that the target content logo is dragged to at least one of the preset areas, outputting the target content in the output mode corresponding to the preset area.

In an embodiment, determining corresponding output modes based on the target content, and displaying a preset area corresponding to each of the output modes may include: determining corresponding output modes based on the target content, and displaying preset areas corresponding to the output modes around the target content logo.

In an embodiment, determining corresponding output modes based on the target content, and displaying a preset area corresponding to each of the output modes may include: determining output modes corresponding to the target content based on the target content and output modes supported by the terminal; wherein each of the output modes supported by the terminal may be correspondingly provided with a hardware port or a software mark; and according to the determined output modes for the target content, displaying a preset area at a position on the display area of the terminal and close to the hardware port or software mark corresponding to each of the output modes.

In an embodiment, displaying a preset area at a position on the display area of the terminal and close to the hardware port or software mark corresponding to each of the output modes may include: based on the determined output modes of the target content, determining the position of the hardware port or software mark corresponding to each of the output modes on the terminal; wherein, positions of the hardware ports or software corresponding to the output modes supported by the terminal are preset; and based on the determined position, displaying a preset area close to each of the positions on the display area of the terminal.

In an embodiment, corresponding logos or texts may be displayed in the preset areas corresponding to the output modes.

In an embodiment, a terminal for outputting a target content may include: an acquiring module, a determination module and a control module; the acquiring module may be configured to acquire a target content and display the target content logo; the determination module may be configured to determine corresponding output modes based on the target content, and display a preset area corresponding to each of the output modes; the control module may be configured to output the target content in the output mode corresponding to the present area when it is detected that the target content logo is dragged to at least one of the preset areas.

In an embodiment, the determination module may include a determination unit and a display unit, the determination unit being configured to determine corresponding output modes based on the target content; and the display unit being configured to display preset areas corresponding to the output modes around the target content logo.

In an embodiment, the determination module may include a determination unit and a display unit, the determination unit being configured to determine output modes corresponding to the target content based on the target content and output modes supported by the terminal; wherein each of the output modes supported by the terminal is correspondingly provided with a hardware port or a software mark; the display unit being configured to, based on the determined output modes for the target content, display a preset area at a position on the display area of the terminal and close to the hardware port or software mark corresponding to each of the output modes.

In an embodiment, the display unit may be configured to, based on the determined output modes for the target content, determine the position of the hardware port or software mark corresponding to each of the output modes on the terminal; and, based on the determined position, display a preset area close to each of the positions on the display area of the terminal, wherein positions of the hardware ports or software corresponding to the output modes supported by the terminal are preset.

In an embodiment, corresponding logos or texts may be displayed in the preset areas corresponding to the output modes.

Advantageous effects of the examples of the present invention may include: unlike the prior art, by acquiring a target content and displaying the target content logo, determining corresponding output modes based on the target content, and displaying preset areas corresponding thereto. When it is detected that the target content logo is dragged to at least one of the preset areas, the present invention may include outputting the target content in the output mode corresponding to the preset area. The present invention can rapidly display output modes that support the target content selected by a user, can enable the user to rapidly select or switch the output mode so as to output the target content, and can facilitate the user operations.

DETAILED DESCRIPTION

In the description below, specific details, such as a specific system structure, port, technology, etc., are mentioned, for the purpose of description rather than limitation, such that the present invention is thoroughly understood. However, those skilled in the art may understand that the present invention may still be implemented in other embodiments without these specific details. Detailed description of well-known devices, circuits and methods are omitted to prevent unnecessary details from obstructing the description of the present application.

Figure 1:
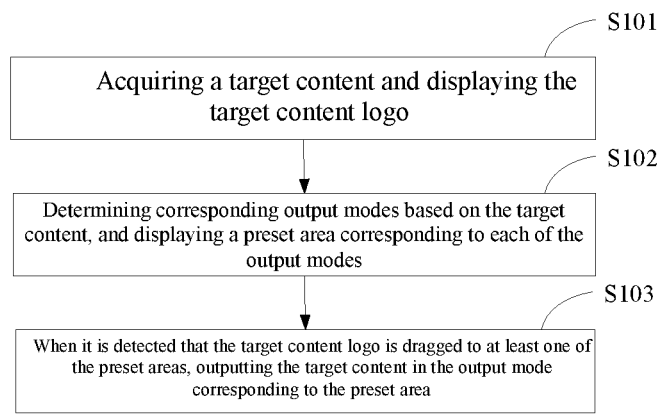
FIG. 1 includes a flow chart of one embodiment of the method for outputting a target content according to the present invention.

FIG. 1 is a flow chart of one embodiment of the method for outputting a target content according to the present invention. The main body for implementing the present embodiment is a mobile terminal. The method for outputting a target content in the present embodiment comprises the following steps:

S101: acquiring a target content and displaying the target content logo.

When a user activates any function of a mobile terminal, the mobile terminal may acquire a target content selected by the user and display the logo of the acquired target content, wherein the target content is a content that can be generated, stored by all mobile terminals and be outputted by corresponding hardware. The target content may be a combination of one or more of the following: music, video, document, video stream, audio stream and data stream, but is not limited thereto. The target content may also be other content that a mobile terminal can output.

Figure 2:
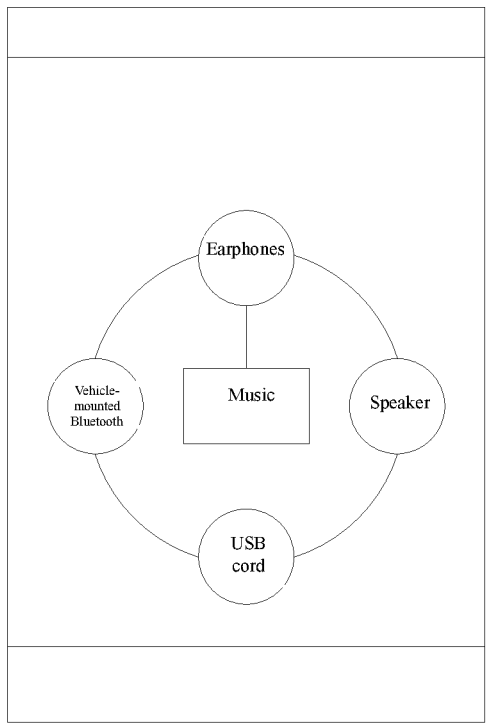
FIG. 2 illustrates one embodiment of the method for outputting a target content according to the present invention.

FIG. 2 illustrates one embodiment of the method for outputting a target content according to the present invention.

For example, when a user desires to listen to music, the user can activate the audio playing program in the mobile terminal to play music or an audio file. The target content selected by the user and acquired by the mobile terminal may be music or an audio file, and the logo of the acquired target content, "music", may be displayed in the display area.

Step S102: may include determining corresponding output modes based on the target content, and displaying a preset area corresponding to each of the output modes.

The mobile terminal may determine corresponding output modes based on the acquired target content, and can display a preset area corresponding to each of the output modes.

For example, after having acquired a target content that is music or an audio file, the mobile terminal can determine that the output mode corresponding to the music or the audio file is output through earphones, output through a speaker, output through a USB cable to other devices, output through vehicle-mounted Bluetooth, etc.

When the output modes corresponding to the music or the audio file are determined, the mobile terminal can display each output mode correspondingly at a preset area for users to select an output mode to output the target content, wherein each output mode corresponds to a preset area. The mobile terminal can display the earphone output in the first preset area, the speaker output in the second preset area, the USB cable output in the third preset area, and the vehicle-mounted Bluetooth output in the fourth preset area.

Optionally, the mobile terminal may display corresponding logos, texts or combinations of logos and texts in the preset areas corresponding to the output modes. In the present embodiment, text can be displayed in the preset areas corresponding to the output modes: "earphone" can be displayed in the first preset area corresponding to the earphone output mode, "speaker" can be displayed in the second preset area corresponding to the speaker output mode, "USB cable" can be displayed in the third preset area corresponding to the USB cable output, and "vehicle-mounted Bluetooth" can be displayed in the fourth preset area corresponding to the vehicle-mounted Bluetooth output mode.

It should be understood that preset areas corresponding to all output modes may be arbitrarily distributed, or may be displayed around the logo of the target content, or may be correspondingly displayed close to hardware or software mark of the mobile terminal that supports the target content; however, it is not limited thereby, and preset areas corresponding to all output modes may be displayed in other ways.

Step S103 may include: when it is detected that the target content logo is dragged to at least one of the preset areas, outputting the target content in the output mode corresponding to the preset area.

When detecting that the target content logo is dragged to at least one of the preset areas, the mobile terminal may acquire the output mode corresponding to the preset area and can output the target content in the output mode corresponding to the preset area.

For example, when a user selects the earphone output mode to output the target content, the mobile terminal can detect that the target content logo, "music", is dragged to the first preset area corresponding to the earphone output mode, it acquires the output mode corresponding to the first preset area to be playing through earphones, and the mobile terminal plays the audio file selected by the user through earphones.

It should be understood that a user may arbitrarily select one output mode from the output modes supported by the target content so as to output the target content, and when the output modes supported by the target content supports simultaneous output, the user may select output modes that support simultaneous output at the same time to output the target content.

In an embodiment, by acquiring a target content and displaying the target content logo, determining corresponding output modes based on the target content, and displaying preset areas corresponding thereto, when it is detected that the target content logo is dragged to at least one of the preset areas, the target content is outputted in the output mode corresponding to the preset area. The mobile terminal can rapidly display output modes that support the target content selected by a user, and can enable the user to rapidly select or switch the output mode so as to output the target content, and facilitate user operations.

Figure 3:
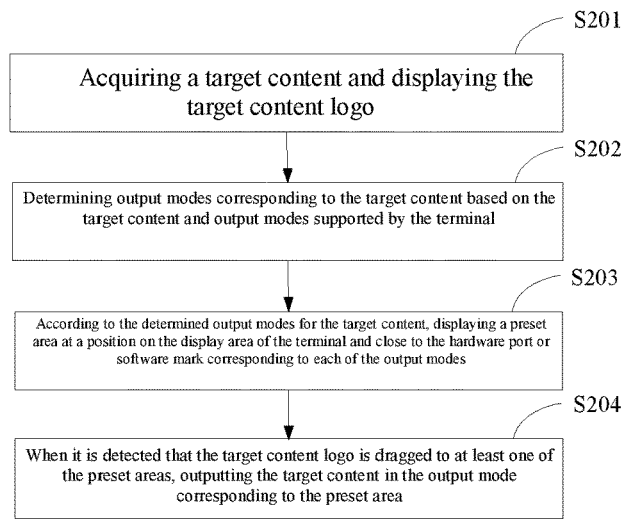
FIG. 3 includes a flow chart of another embodiment of the method for outputting a target content according to the present invention.

FIG. 3 is a flow chart of another embodiment of the method for outputting a target content according to the present invention. The main body for implementing the present embodiment is a mobile terminal. The method for outputting a target content in the present embodiment may include the following steps:

Step S201 may include: acquiring a target content and displaying the target content logo.

When a user activates any function of a mobile terminal, the mobile terminal can acquire a target content selected by the user and display the logo of the acquired target content, wherein the target content is a content that can be generated, and stored by all mobile terminals and be outputted by corresponding hardware. The target content can be a combination of one or more of the following: music, video, document, video stream, audio stream and data stream, but is not limited thereto. The target content may also be other content that a mobile terminal can output.

Figure 4:
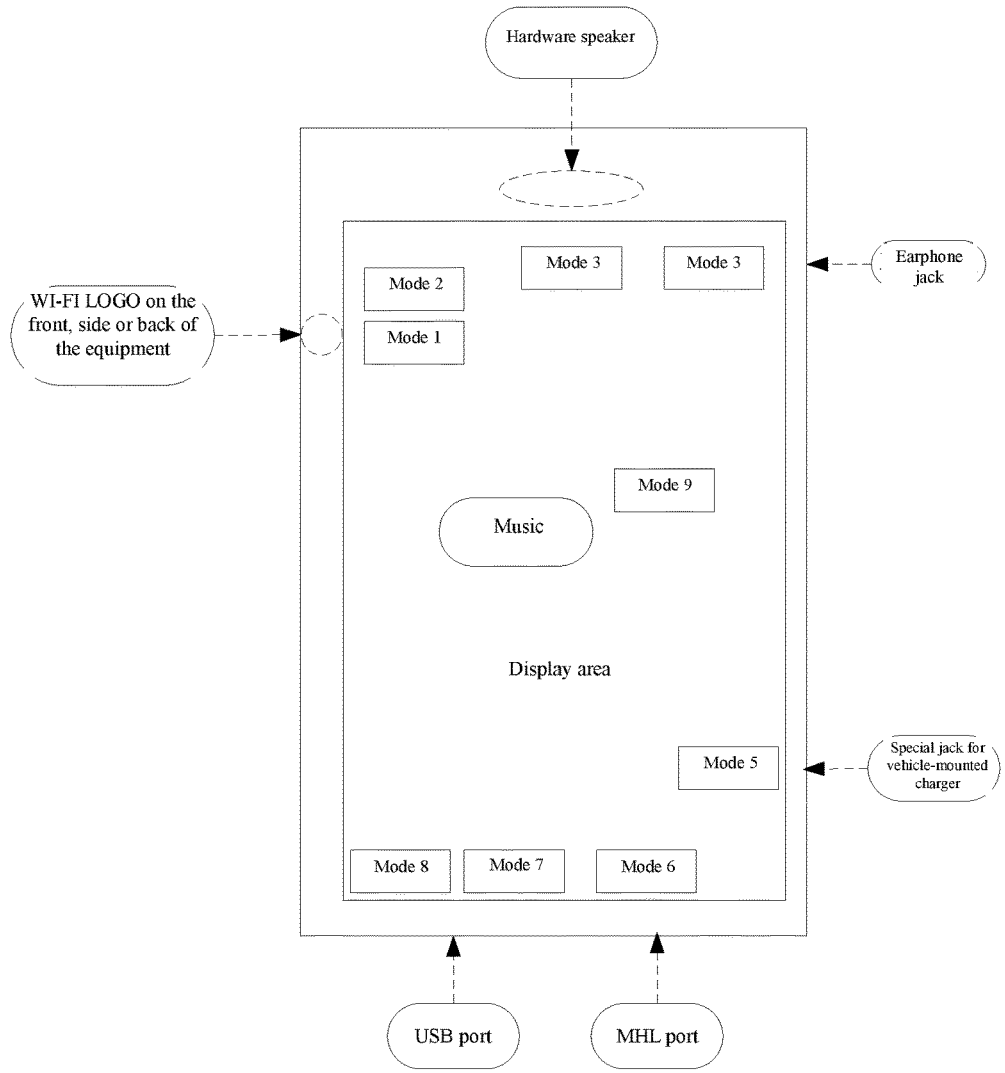
FIG. 4 illustrates another embodiment of the method for outputting a target content according to the present invention.

FIG. 4 illustrates another embodiment of the method for outputting a target content according to the present invention.

For example, when a user desires to listen to music, the user can activate the audio playing program in the mobile terminal to play music or an audio file. The target content selected by the user and acquired by the mobile terminal can be music or an audio file, and the logo of the acquired target content, "music", can be displayed in the display area.

Step S202 can include: determining output modes corresponding to the target content based on the target content and output modes supported by the terminal; wherein each of the output modes supported by the terminal can be correspondingly provided with a hardware port or a software mark.

The mobile terminal can determine corresponding output modes based on the acquired target content, and display a preset area corresponding to each of the output modes; wherein each of the output modes supported by the terminal can be correspondingly provided with a hardware port or a software mark. The hardware port comprises an earphone jack, a special jack for vehicle-mounted charger, a Mobile High-Definition Link (MHL), a USB port and hard identifiers corresponding to the output modes on the mobile terminal, and the software mark can include menu position, software that the output modes correspond to, etc.

For example, after having acquired a target content that is music or an audio file, the mobile terminal determines that the output mode corresponding to the music or the audio file is playback by a Wi-Fi audio system through Wi-Fi connection, transmission of the audio file to a device through Wi-Fi, output through a speaker, output through earphones, playback by a vehicle-mounted audio system through Bluetooth connection, playback by an MHL device through an MHL port, playback by a USB device through a USB port, transmission of the audio file to a device through a USB port, etc.

Step S203 may include: according to the determined output modes for the target content, displaying a preset area at a position on the display area of the terminal and close to the hardware port or software mark corresponding to each of the output modes.

In an embodiment, the step of displaying a preset area at a position on the display area of the terminal and close to the hardware port or software mark corresponding to each of the output modes can include:

Based on the determined output modes of the target content, determining the position of the hardware port or software mark corresponding to each of the output modes on the terminal; and based on the determined position, displaying a preset area close to each of the positions on the display area of the terminal. In an embodiment, positions of the hardware ports or software mark corresponding to the output modes supported by the terminal can be preset.

When the output modes of the target content are determined, the mobile terminal can display a preset area at a position on the display area of the mobile terminal and close to the hardware port or software mark corresponding to each of the output modes. Each hardware port or software mark can correspond to a preset area.

In an embodiment, based on the determined output modes of the target content, the mobile terminal can determine the position of the hardware port or software mark corresponding to each of the output modes on the mobile terminal, and based on the determined position, can display a preset area close to each of the positions on the display area of the mobile terminal. Positions of the hardware ports or software mark corresponding to the output modes supported by the mobile terminal can be preset.

For example, when the output modes corresponding to the music or the audio file are determined, the mobile terminal can display each output mode correspondingly at a position on the display area of the mobile terminal and close to the hardware port or software mark corresponding to each of the output modes for users to select an output mode to output the target content, wherein each hardware port or software mark corresponds to a preset area.

The logo of the target content, "music", can be displayed at any position in the display area or the central position of the display area of the mobile terminal.

The first preset area corresponding to the playback by a Wi-Fi audio system through Wi-Fi connection can be displayed at a position close to the Wi-Fi logo on the mobile terminal. The second preset area corresponding to the transmission of the audio file to a device through Wi-Fi can be displayed at a position close to the Wi-Fi logo on the mobile terminal. The third preset area corresponding to the playback through a speaker can be displayed at a position close to the speaker. The fourth preset area corresponding to the playback through earphones can be displayed at a position close to the earphone jack. The fifth preset area corresponding to the playback by a vehicle-mounted audio system through Bluetooth connection can be displayed at a position close to the vehicle-mounted special charging port. The sixth preset area corresponding to the playback by an MHL device through an MHL port can be displayed at a position close to the MHL port. The seventh preset area corresponding to the playback by a USB playback device through a USB port can be displayed at a position close to the USB port. The eighth preset area corresponding to the transmission of the audio file to a device through a USB port can be displayed at a position close to the USB port.

Optionally, when an output mode cannot be represented in a position-associated manner, such as a hardware port or a software mark, a method to define an output mode corresponding to the target content can be used. For example, the method may define an output mode corresponding to operation commands like deleting the target content, and display a preset area corresponding to the output mode that corresponds to operation commands like deleting the target content around the target content. In an embodiment, the method can display the ninth preset area corresponding to operation commands like deleting the target content at a position close to the target content, "music".

Optionally, the mobile terminal may display corresponding logos, texts or combinations of logos and texts in the preset areas corresponding to the output modes. In the present embodiment, texts can be displayed in the preset areas corresponding to the output modes: "Mode 1" can be displayed in the first preset area corresponding to the playback by a Wi-Fi audio system through Wi-Fi connection. "Mode 2" can be displayed in the first preset area corresponding to the transmission of the audio file to a device through Wi-Fi. "Mode 3" can be displayed in the third preset area corresponding to the playback through a speaker. "Mode 4" can be displayed in the fourth preset area corresponding to the playback through earphones. "Mode 5" can be displayed in the fifth preset area corresponding to the playback by a vehicle-mounted audio system through Bluetooth connection. "Mode 6" can be displayed in the sixth preset area corresponding to the playback by an MHL device through an MHL port. "Mode 7" can be displayed in the seventh preset area corresponding to the playback by a USB playback device through a USB port. "Mode 8" can be displayed in the eighth preset area corresponding to the transmission of the audio file to a device through a USB port. "Mode 9" can be displayed in the ninth preset area corresponding to operation commands like deleting the target content.

In the present embodiment, the preset area corresponding to each output mode can be displayed at a position of a hardware port or a software mark on the mobile terminal respectively corresponding to each output mode; however, it is not limited thereby, and in other embodiments, the preset area corresponding to each output mode may be displayed in the display area of the mobile terminal according to other rules, for example, by being displayed in an established mode or displayed according to user habits.

Step S204 may include: when it is detected that the target content logo is dragged to at least one of the preset areas, outputting the target content in the output mode corresponding to the preset area.

When detecting that the target content logo is dragged to at least one of the preset areas, the mobile terminal can acquire the output mode corresponding to the preset area and output the target content in the output mode corresponding to the preset area.

For example, when a user selects the earphone output mode to output the target content, the mobile terminal can detect that the target content logo, "music", is dragged to the first preset area corresponding to "Mode 1", and it can acquire the output mode corresponding to the first preset area to be playback by a Wi-Fi audio system through a Wi-Fi connection. The mobile terminal can play the target content (the music or audio file selected by the user) by a Wi-Fi audio system through the Wi-Fi connection.

It should be understood that a user may arbitrarily select one output mode from the output modes supported by the target content so as to output the target content, and when the output modes supported by the target content support simultaneous output, the user may select output modes that support simultaneous output at the same time to output the target content.

It should be understood that, in the present embodiment, the preset area corresponding to each output mode supported by the target content can be displayed on the display area of the mobile terminal and close to the position of a hardware port or a software mark respectively corresponding to each output mode. In other embodiments, the preset area corresponding to each output mode supported by the target content may be displayed around the target content logo.

It should be understood that, in the present embodiment, the target content can be outputted in an output mode corresponding to a preset area when it is detected that the target content logo is dragged to the preset area. In other embodiments, the target content may be outputted in an output mode corresponding to a preset area when it is detected that the area a user touches belongs to at least any one of the preset areas, which can easily run a variety of functions in situations like the screen illumination of a mobile terminal being turned off, or a mobile terminal being connected to a projection device to project the local screen to other devices.

According to the above solution, by acquiring a target content and displaying the target content logo, determining corresponding output modes based on the target content, and displaying preset areas corresponding thereto, when it is detected that the target content logo is dragged to at least one of the preset areas, the invention can output the target content in the output mode corresponding to the preset area. The mobile terminal can rapidly display output modes that support the target content selected by a user, and can enable the user to rapidly select or switch the output mode so as to output the target content, and facilitate user operations.

As the preset area corresponding to each output mode supported by the target content is displayed on the display area of the mobile terminal and close to the position of a hardware port or a software mark respectively corresponding to each output mode, it can enable a user to rapidly identify the hardware port or software mark corresponding to an output mode, and complete rapid selection or switch.

Figure 5:
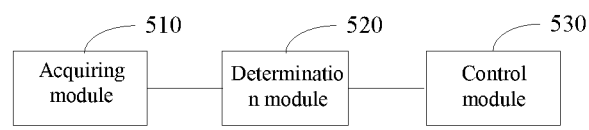
FIG. 5 illustrates a structure of one embodiment of the terminal for outputting a target content according to the present invention.

FIG. 5 illustrates the structure of one embodiment of the terminal for outputting a target content according to the present invention. The main structure for implementing the present embodiment is a mobile terminal. The modules contained in the terminal for outputting a target content according to the present embodiment correspond to the steps for implementing the embodiment corresponding to FIG. 1. Please refer to FIG. 1 and relevant description of the corresponding embodiment thereof for details, which will not be described herein. The terminal for outputting a target content according to the present embodiment comprises an acquiring module 510, a determination module 520 and a control module 530.

The acquiring module 510 can be configured to acquire a target content and display the target content logo. For example, the acquiring module 510 can be configured to acquire a target content and display the target content logo. The acquiring module 510 can send the acquired target content to the determination module 520.

The determination module 520 can be configured to receive the target content sent by the acquiring module 510, determine corresponding output modes based on the target content, and display a preset area corresponding to each of the output modes. For example, the determination module 520 can receive the target content sent by the acquiring module 510, determine corresponding output modes based on the target content, and display a preset area corresponding to each of the output modes. Corresponding logos or texts can be displayed in the preset areas corresponding to the output modes.

Optionally, the determination module 520 can be specifically configured to receive the target content sent by the acquiring module 510, determine corresponding output modes based on the target content, and display preset areas corresponding to the output modes around the target content logo.

The determination module 520 can send the corresponding relations between all output modes and preset areas to the control module 530.

The control module 530 can be configured to receive the corresponding relations between all output modes and preset areas sent by the determination module 520, and when it is detected that the target content logo is dragged to at least one of the preset areas, the control module can output the target content in the output mode corresponding to the preset area. For example, the control module 530 can be configured to receive the corresponding relations between all output modes and preset areas sent by the determination module 520. When it is detected that the target content logo is dragged to at least one of the preset areas, the control module can acquire the output mode corresponding to the preset area, and output the target content in the output mode corresponding to the preset area.

It should be understood that a user may arbitrarily select one output mode from the output modes supported by the target content so as to output the target content, and when the output modes supported by the target content support simultaneous output, the user may select output modes that support simultaneous output at the same time to output the target content.

According to the above solution, by acquiring a target content and displaying the target content logo, the invention may determine corresponding output modes based on the target content, and display preset areas corresponding thereto. When it is detected that the target content logo is dragged to at least one of the preset areas, the invention can output the target content in the output mode corresponding to the preset area, and the mobile terminal can rapidly display output modes that support the target content selected by a user, can enable the user to rapidly select or switch the output mode so as to output the target content, and facilitate the user operations.

Figure 6:
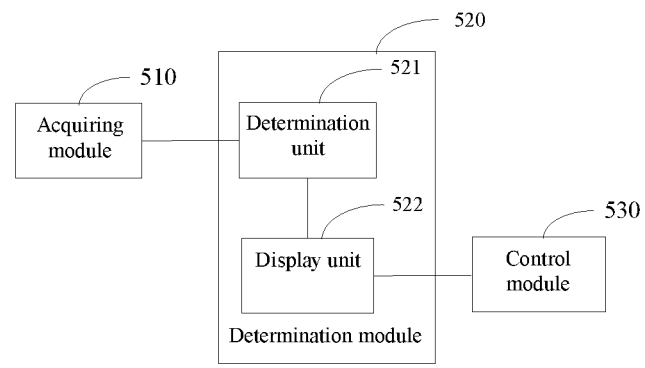
FIG. 6 illustrates a structure of another embodiment of the terminal for outputting a target content according to the present invention.

FIG. 6 illustrates the structure of another embodiment of the terminal for outputting a target content according to the present application. The main structure for implementing the present embodiment is a mobile terminal. The modules contained in the terminal for outputting a target content according to the present embodiment correspond to the steps for implementing the embodiment corresponding to FIG. 3. Please refer to FIG. 3 and relevant description of the corresponding embodiment thereof for details, which will not be described herein. The terminal for outputting a target content according to the present embodiment may include an acquiring module 510, a determination module 520 and a control module 530. The determination module 530 can include a determination unit 531 and a display unit 532.

The acquiring module 510 can be configured to acquire a target content and display the target content logo. For example, the acquiring module 510 can be configured to acquire a target content and display the target content logo. The acquiring module 510 can send the acquired target content to the determination unit 521.

The determination unit 521 can be configured to determine output modes corresponding to the target content based on the target content and output modes supported by the terminal. Each of the output modes supported by the terminal can be correspondingly provided with a hardware port or a software mark. For example, the determination unit 521 can determine output modes corresponding to the target content based on the target content and output modes supported by the terminal. Each of the output modes supported by the terminal can be correspondingly provided with a hardware port or a software mark. The determination unit 521 can send the output modes corresponding to the target content to the display unit 522.

The display unit 522 can be configured to receive the output modes corresponding to the target content sent by the determination unit 521, and based on the determined output modes for the target content, display the preset area at a position on the display area of the terminal and close to the hardware port or software mark corresponding to each of the output modes. For example, the display unit 522 can receive the output modes corresponding to the target content sent by the determination unit 521, and based on the determined output modes for the target content, display the preset area at a position on the display area of the terminal and close to the hardware port or software mark corresponding to each of the output modes.

The display unit 522 can be specifically configured to, based on the determined output modes of the target content, determine the position of the hardware port or software mark corresponding to each of the output modes on the terminal; and according to the determined position, display the preset area close to each of the positions on the display area of the terminal. Positions of the hardware ports or software corresponding to the output modes supported by the terminal can be preset. For example, based on the determined output modes of the target content, the display unit 522 can determine the position of the hardware port or software mark corresponding to each of the output modes on the terminal, and based on the determined position, display the preset area close to each of the positions on the display area of the terminal. Positions of the hardware ports or software corresponding to the output modes supported by the terminal can be preset. Corresponding logos or texts can be displayed in the preset areas corresponding to the output modes.

Optionally, the display unit 522 can be further configured to receive the output modes corresponding to the target content sent by the determination unit 521, and display preset areas corresponding to the output modes around the target content logo.

The display unit 522 can send the corresponding relations between all output modes and preset areas to the control module 530.

The control module 530 can be configured to receive the corresponding relations between all output modes and preset areas sent by the determination module 520, and when it is detected that the target content logo is dragged to at least one of the preset areas, the control module can output the target content in the output mode corresponding to the preset area. For example, the control module 530 can be configured to receive the corresponding relations between all output modes and preset areas sent by the determination module 520. When it is detected that the target content logo is dragged to at least one of the preset areas, the control module can acquire the output mode corresponding to the preset area, and output the target content in the output mode corresponding to the preset area.

It should be understood that a user may arbitrarily select one output mode from the output modes supported by the target content so as to output the target content, and when the output modes supported by the target content supports simultaneous output, the user may select output modes that support simultaneous output at the same time to output the target content.

By acquiring a target content and displaying the target content logo, the invention can determine corresponding output modes based on the target content, and display preset areas corresponding thereto. When it is detected that the target content logo is dragged to at least one of the preset areas, the invention can output the target content in the output mode corresponding to the preset area. The mobile terminal can rapidly display output modes that support the target content selected by a user, and can enable the user to rapidly switch the output mode, and facilitate the user operations.

As the preset area corresponding to each output mode supported by the target content is displayed on the display area of the mobile terminal and close to the position of a hardware port or a software mark respectively corresponding to each output mode, it can enable a user to rapidly identify the hardware port or software mark corresponding to an output mode, and complete rapid selection or switch.

It should be understood that, in all of the above embodiments of the present application, music or an audio file can be used as the target content for description. When the target content selected by a user is other content, the output modes thereof may be similar to the modes when the target content is music or an audio file, which will not be described herein.

In the description above, specific details, such as a specific system structure, port, technology, etc., are mentioned, for the purpose of description rather than limitation. However, those skilled in the art should understand that the present application may still be implemented in other embodiments without these specific details. Detailed description of well-known devices, circuits and methods are omitted to prevent unnecessary details from obstructing the description of the present application.

The invention claimed is:

1. A method for outputting a target content from a mobile terminal to a non-mobile terminal output device, the method comprising:
   acquiring, via the mobile terminal, the target content and displaying a target content logo on a display of the mobile terminal;
   determining, via the mobile terminal, a type of the target content;
   determining, via the mobile terminal, a plurality of output modes corresponding to the type of the target content;
   displaying, via the display, a plurality of preset areas corresponding to the output modes around the target content logo, where each preset area, of the plurality of preset areas, is located at a position on the display that is proximate to a hardware port or a software mark corresponding to each output mode, of the plurality of output modes; and
   outputting, via the mobile terminal, the target content to the non-mobile terminal output device based on a user selection of a preset area corresponding to the output device;
   wherein, when an output mode cannot be represented in a position-associated manner in the form of a hardware port or a software mark, the output mode that cannot be represented in a position-related manner is represented by an operation command in a preset area that is not position associated with a hardware port or a software mark.

2. The method according to claim 1, wherein displaying the preset areas further comprises:
   determining a position, on the mobile terminal, of the hardware port or the software mark corresponding to each of the output modes; and
   displaying a preset area close to each of the positions on the display.

3. The method according to claim 1, further comprising:
   displaying, in each of the preset areas, at least one of a logo or text corresponding to an output mode, of the plurality of output modes, associated with a corresponding preset area.

4. The method of claim 1, wherein the plurality of output modes supported by the target content support simultaneous output.

5. The method of claim 1, further comprising:
   selecting, via a user of the mobile terminal, output modes, of the plurality of output modes, that support simultaneous output to output the target content.

6. The method of claim 1, wherein the outputting, via the mobile terminal, the target content further comprises:
   outputting, via the mobile terminal, the target content to the non-mobile terminal output device based on a user touching a preset area corresponding to the non-mobile terminal output device.

7. The method of claim 1, wherein the outputting, via the mobile terminal, the target content further comprises:
   outputting, via the mobile terminal, the target content to the non-mobile terminal output device based on the target content logo being dragged to a preset area corresponding to the non-mobile terminal output device.

* * * * *